US006893615B1

United States Patent
Alexander

(10) Patent No.: US 6,893,615 B1
(45) Date of Patent: May 17, 2005

(54) METHOD AND SYSTEM FOR PROVIDING SUBSTANTIALLY WATER-FREE EXHAUST GAS

(75) Inventor: Wade J. Alexander, Owasso, OK (US)

(73) Assignee: NCO2 Company LLC, Tulsa, OK (US)

( * ) Notice: Subject to any disclaimer, the term of this patent is extended or adjusted under 35 U.S.C. 154(b) by 823 days.

(21) Appl. No.: 09/681,601

(22) Filed: May 4, 2001

(51) Int. Cl.$^7$ .......................... B01D 50/00; B01D 53/34
(52) U.S. Cl. ...................... 422/177; 422/168; 422/169
(58) Field of Search ............................... 422/177, 168, 422/169, 180, 181, 170, 171

(56) References Cited

U.S. PATENT DOCUMENTS

| | | | |
|---|---|---|---|
| 1,868,755 A | 7/1932 | Mount | |
| 1,945,407 A | 1/1934 | Adair et al. | 183/115 |
| 2,240,550 A | 5/1941 | Conlon, Jr. | 166/21 |
| 2,825,408 A | 3/1958 | Watson | 166/11 |
| 3,004,601 A | 10/1961 | Bodine | 166/39 |
| 3,100,528 A | 8/1963 | Plummer et al. | 166/42 |
| 3,137,344 A | 6/1964 | Wiemer | 166/9 |
| 3,381,523 A | 5/1968 | Nettles | 73/40.5 |
| 3,653,438 A | 4/1972 | Wagner | 166/266 |
| 3,808,805 A * | 5/1974 | Miramontes | 60/274 |
| 3,908,762 A | 9/1975 | Redford | 166/263 |
| 4,324,291 A | 4/1982 | Wong et al. | 166/252 |
| 4,325,432 A | 4/1982 | Henry | 166/245 |
| 4,533,374 A | 8/1985 | Haag | 62/18 |
| 4,546,829 A | 10/1985 | Martin et al. | 166/267 |
| 4,593,763 A | 6/1986 | Burke | 166/302 |
| 4,656,831 A * | 4/1987 | Budininkas et al. | 60/297 |
| 4,725,381 A * | 2/1988 | Pinto | 252/376 |
| 4,891,939 A | 1/1990 | Brighenti | 60/278 |
| 5,232,049 A | 8/1993 | Christiansen et al. | 166/252 |
| 5,693,121 A * | 12/1997 | Callahan et al. | 95/39 |
| 5,988,280 A | 11/1999 | Crawford et al. | 166/303 |
| 6,039,116 A | 3/2000 | Stevenson et al. | 166/263 |

* cited by examiner

Primary Examiner—M. Alexandra Elve
(74) Attorney, Agent, or Firm—Gable & Gotwals; Paul H. Johnson

(57) ABSTRACT

A method and system for providing substantially water-free compressed exhaust gas including extracting exhaust gas from a hydrocarbon fuel consuming engine, passing engine exhaust gas through a catalytic converter, passing the exhaust gas from the catalytic converter through a first compressor and chiller/separator in which the exhaust gas is compressed and chilled below the dew point temperature thereof to cause entrained water vapor therein to condense out, separating out and disposing of the condensed water to achieve extra dry exhaust gas and compressing the extra dry exhaust gas in a second compressor to provide compressed exhaust gas for industrial purposes such as for injecting into a subterranean formation to augment the production of crude oil.

4 Claims, 1 Drawing Sheet

METHOD AND SYSTEM FOR PROVIDING SUBSTANTIALLY WATER-FREE EXHAUST GAS

CROSS REFERENCE TO RELATED APPLICATIONS

This application is not related to any pending United States or international patent application. This application is not referenced in any Microfiche Appendix.

BACKGROUND OF INVENTION

Most oil producing subterranean formations are characterized by pressurized gas. In some parts of the world hydrocarbon bearing formations have pressures sufficient to force liquid hydrocarbons (crude oil) to the earth's surface. In other parts of the world, the gas pressure is not sufficient to force liquid hydrocarbons to the earth's surface. However, in such formations, the presence of gas is nevertheless important since in many formations a gas drive is required to move liquid hydrocarbons from within the formation to the site of producing wells.

As crude oil is extracted from subterranean reservoirs, the gas pressures decrease. As the gas pressures decrease, frequently crude oil production rates fall. For these and other reasons, it has been found desirable in producing many subterranean formations to maintain a gas pressure within the formation.

Th characteristics of gas injected into a well can be critical. Water or free oxygen contained in gas can cause plugging of formations. Further, water or free oxygen can result in bacteria growth that can plug a producing formation.

Ideally, gas injected into a reservoir to augment the production of liquid hydrocarbons should be water-free. Therefore, when treating gas prior to injection, a most important step is to remove substantially all water.

The present invention provides a process for generating substantially water-free exhaust gas that is particularly useful for injection into hydrocarbon bearing formations.

Examples of the use of exhaust gas from an engine for industrial purposes and examples of the use of exhaust gas to augment liquid hydrocarbon production are found in the following United States patents:

[United States Patents]

| U.S. Pat. No. | Inventor | Title |
| --- | --- | --- |
| 1,868,755 | Mount | Dehydrator |
| 1,945,407 | Adair et al. | Process of Purifying Gases |
| 2,240,550 | Conlon, Jr. | Methe of Returning Gas to Gas-Producing Formations |
| 2,825,408 | Watson | Oil Recovery by Subsurface Thermal Processing |
| 3,004,601 | Bodine | Method and Apparatus for Augmenting Oil Recovery from Wells by Refrigeration |
| 3,100,528 | Plummer et al. | Method for Using Inert Gas |
| 3,137,344 | Wiemer | Minimizing Loss of Driving Fluids in Secondary Recovery |
| 3,381,523 | Nettles | Method and Apparatus for Supplying Gas Under Pressure |
| 3,653,438 | Wagner | Method for Recovery of Petroleum Deposits |
| 3,908,762 | Redford | Method for Estabiishing Communication Path in Viscous Petroleum-Containing Formations including Tar Sand Deposits for Use in Oil Recovery Operations |
| 4,324,291 | Wong et al. | Viscous Oil Recovery Method |
| 4,325,432 | Henry | Method of Oil Recovery |
| 4,533,374 | Haag | Method for Reducing Air Pollution |
| 4,546,829 | Martin et al. | Enhanced Oil Recovery |
| 4,593,763 | Burke | Carbon Dioxide Well Injection Method |
| 4,891,939 | Brighenti | System for the Cryogenic Processing and Storage of Combustion Products of Heat Engines |
| 5,232,049 | Christiansen et al | Sequentially Flooding a Subterranean Hydrocarbon-Bearing Formation with a Repeating Cycle of Immiscible Displacement Gases |
| 5,988,280 | Crawford et al. | Use of Engine Heat in Treating a Well Bore |
| 6,039,116 | Stevenson et al. | Oil and Gas Production with Periodic Gas Injection |

SUMMARY OF INVENTION

This invention is a method and a system for providing substantially water-free exhaust gas useful for industrial purposes and particularly useful for injection into subterranean formations to augment the production of liquid hydrocarbons. The method includes the steps of: 1) extracting exhaust gas from hydrocarbon fuel consuming engine; 2) passing the gas from step 1 through a catalytic converter; 3) cooling the gas from step 2 to provide a cooled exhaust gas; 4) passing the cooled exhaust gas from step 3 through a liquid separator by which entrained water is extracted to provide a dryer exhaust gas; 5) chilling the dryer exhaust gas from step 4 to below the dew point temperature to cause water to condense out; 6) extracting the condensed water from step 5 to provide substantially water-free exhaust gas; and 7) compressing the substantially water-free exhaust gas for industrial purposes such as for injecting into a hydrocarbon producing formation.

A system for practicing the method of this invention includes a hydrocarbon fuel consuming engine tha produces exhaust gas. A catalytic converter is connected to receive the exhaust gas from the engine. A compressor/chiller is employed by which the exhaust gas from the catalytic converter is compressed and chilled below the dew point temperature to cause water vapor entrained therein to condense out, the condensed water being extracted to thereby provide substantially water-free exhaust gas that is compressed for injection into a subterranean formation.

A better understanding of the invention will be obtained from the following description and claims taken in conjunction with the attached drawing.

BRIEF DESCRIPTION OF DRAWINGS

The drawing discloses a method and a system employing an internal combustion engine having a drive shaft connected to multi-stage compressor. Exhaust gas from the engine is passed through a catalytic converter, cooled and then subjected to compression and chilling below the dew point temperature thereof to cause water entrained therein to condense out. The condensed water is extracted to provide a substantially water-free exhaust gas consisting essentially of nitrogen and carbon dioxide that is ideally suited for compression and injection into an underground hydrocarbon producing formation.

DETAILED DESCRIPTION

Figure 1:
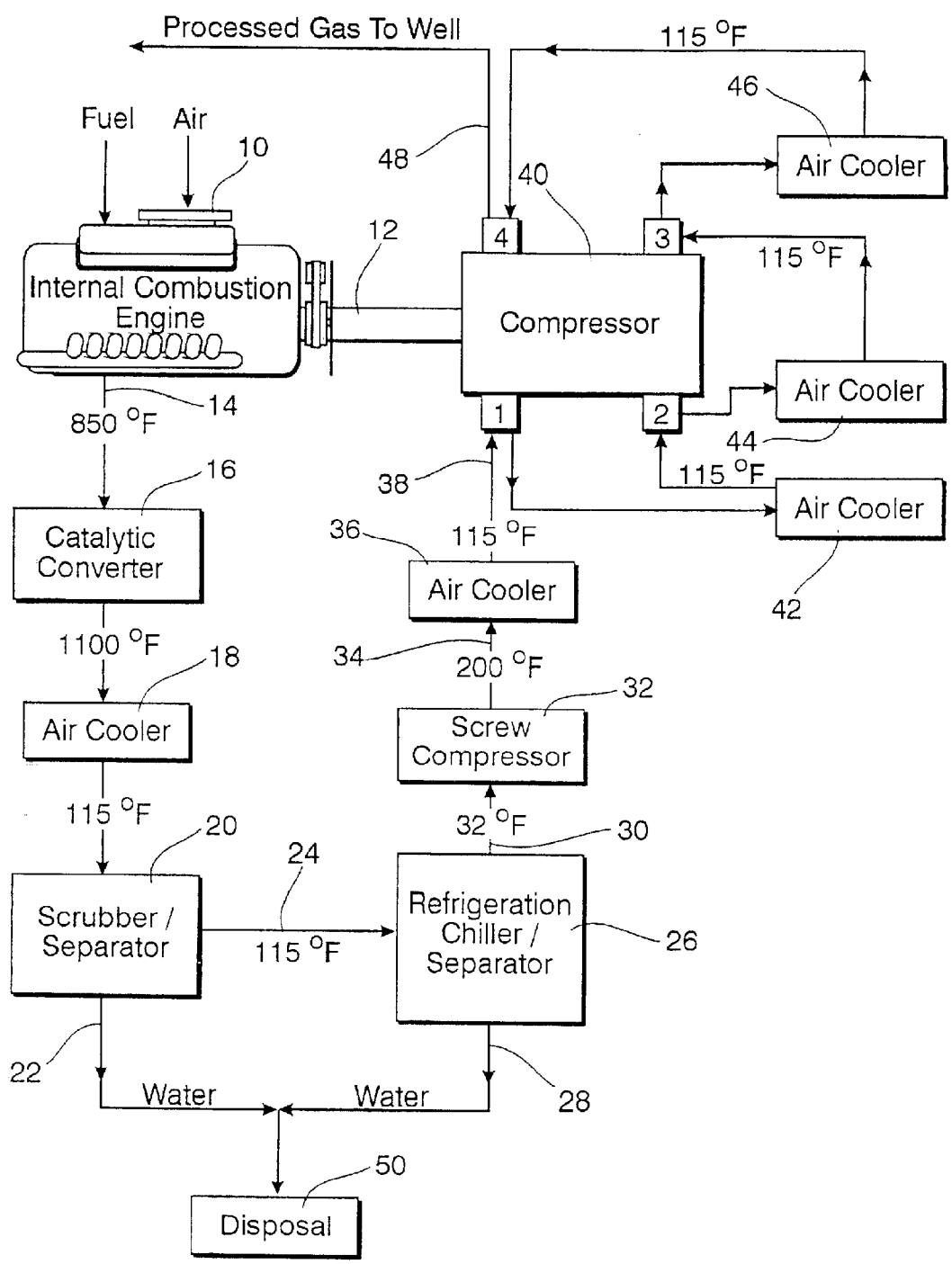

Referring to the drawing, a system that can be used for practicing the method of this invention is shown. The system makes use of the exhaust gas output of an internal combustion engine, the engine being indicated by the numeral 10. Such an engine can be the kind utilized in an automobile, a truck or an industrial engine. The size of the engine will be determined by the quantity of gas required. If more gas is required than can be produced by a single engine, then multiple separate engines may be utilized. The fuel burned by engine 10 can be a hydrocarbon liquid such as gasoline, jet engine fuel, diesel fuel or so forth or the fuel may be a gas such as natural gas or gas derived from liquified natural gas, propane, butane, etc. The engine 10 may be of the piston type as commonly used in automobiles and trucks or may be of the turbine type as frequently used for driving electrical generators. The engine 10 utilizes fuel mixed with ambient air that is combusted within the engine to produce energy output in the form of a rotating drive shaft 12. As a consequence of the combustion of the fuel and air within engine 10, exhaust gas is produced at an exhaust 14.

Gas from exhaust 14 is passed through a catalytic converter 16. In the catalytic converter, heated catalysts react with deleterious components of the exhaust gas to substantially neutralize such components to provide an output from the catalytic converter that is more environmentall acceptable.

The exhaust gas having passed through catalytic converter 16 is reduced to a lower temperature in an air cooler 18. From air coolr 18, the exhaust gas is fed into a scrubber/separator 20 in which any entrained water is separated with the water passing out through a discharge line 22 and the exhaust gas passing through a conduit 24. Next, a refrigeration chiller 26 cools the exhaust gas below the dew point temperature thereof and additional water is extracted from it, water passing out through a water drain 28 and the cooled dry exhaust gas through a pipe 30. A screw compressor 32 compresses the gas. As a consequence of compression, the temperature of the gas is raised. The warm gas passes by conduit 34 to the input of an air cooler 36 where the temperature of the gas is brought down. The output at 38 is then fed into the input of a multi-stage compressor 40, driven by drive shaft 12 from engine 10. In compressor 40, the dry exhaust gas is passed throgh multiple stages of compression. In the arrangement as illustrated, compressor 40 has four stages of compression with intermediate coolers 42, 44 and 46. Cooler 42 is between first compression stage one and second compression stage two; cooler 44 between compression stage two and compression stage three; and cooler 46 between compression stage three and compression stage four. Each of the coolers cools the compressed gas. The compressed gas at the output 48 of the fourth compression stage is substantially water-free and at an elevated pressure suitable to be used for industrial purposes. As previously stated, an example of an ideal use of the substantially water-free exhaust gas at output 48 is injection into a subterraneous hydrocarbon producing formation to maintain the pressure of the formation to thereby augment the production of liquified petroleum.

Representative temperatures of the gas at various stages are indicated in FIG. 1. The gas at exhaust 14 of engine 10 is typically about 850° F. and is typically raised to about 1100° F. in catalytic converter 16. Air cooler 18 preferably reduces the temperature to about 115° F. The temperature of the gas passing out of scrubber/separator 20 is also preferably about 115° F. The temperature of the gas from refrigeration chiller/separator 26 is reduced to near the freezing point—that is, about 32° F. however the gas coming out of compressor 32 is typically about 200° F. This is reduced by air cooler 36 to about 115° F. and each of air coolers 42, 44 and 46 are designed and operated so that the exhaust gas emerging therefrom is at about 115° F. These temperatures are not critical.

Water that is extracted from the exhaust gas must be properly disposed of, therefore discharge line 22 from scrubber/separator 20 and drain 28 from refrigeration chiller/separator 26 are fed to a water disposal site 50. The water from disposal 50 can be injected separately into a non-producing subterranean formation or otherwise disposed of in a proper, environmentally acceptable manner.

The substantially water-free exhaust gas produced by the system and method of this invention is composed of about 85% nitrogen and 15% carbon dioxide. Thus the system, when used to provide gas that is injected back into a subterranean formation also reduces the amount of carbon dioxide that would otherwise pass into the atmosphere.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims of claims, including the full range of equivalency to which each element thereof is entitled.

What is claimed is:

1. A method providing substantially water-free compressed, extra dry exhaust gas for industrial purposes, comprising:

(1) extracting exhaust gas from a hydrocarbon fuel consuming engine;
   (2) passing said exhaust gas through a catalytic converter;
   (3) passing exhaust gas from said catalytic converter through a first compression step and cooling step in which the exhaust gas is chilled below the dew point temperature thereof to cause entrained water therein to condense out;
   (4) separating out and disposing of condensed water from step (3) to provide extra dry exhaust gas; and
   (5) compressing in a second compression step said extra dry exhaust gas to provide compressed extra dry exhaust gas for industrial purposes.

2. A method according to claim 1 including the step of passing said compressed extra dry exhaust gas for injection into a well.

3. A system for providing extra dry, substantially water-free compressed exhaust gas comprising:

a hydrocarbon fuel consuming engine that produces exhaust gas;
   a catalytic converter connected to receive exhaust gas from said engine and having a gas outlet; and
   a first compressor followed by a cooler by which gas from said catalytic converter is chilled to below the dew point temperature thereof to cause water entrained therein to condense out to extract substantially all water therefrom, the extracted water being disposed of to provide substantially water-free exhaust gas that is compressed in a second compressor, the compressed extra dry exhaust gas being usable for industrial purposes.

4. A system according to claim 3 including:
an output conduit for conducting said compressed substantially water-free exhaust gas for injection into a well.

* * * * *